Figure 1:
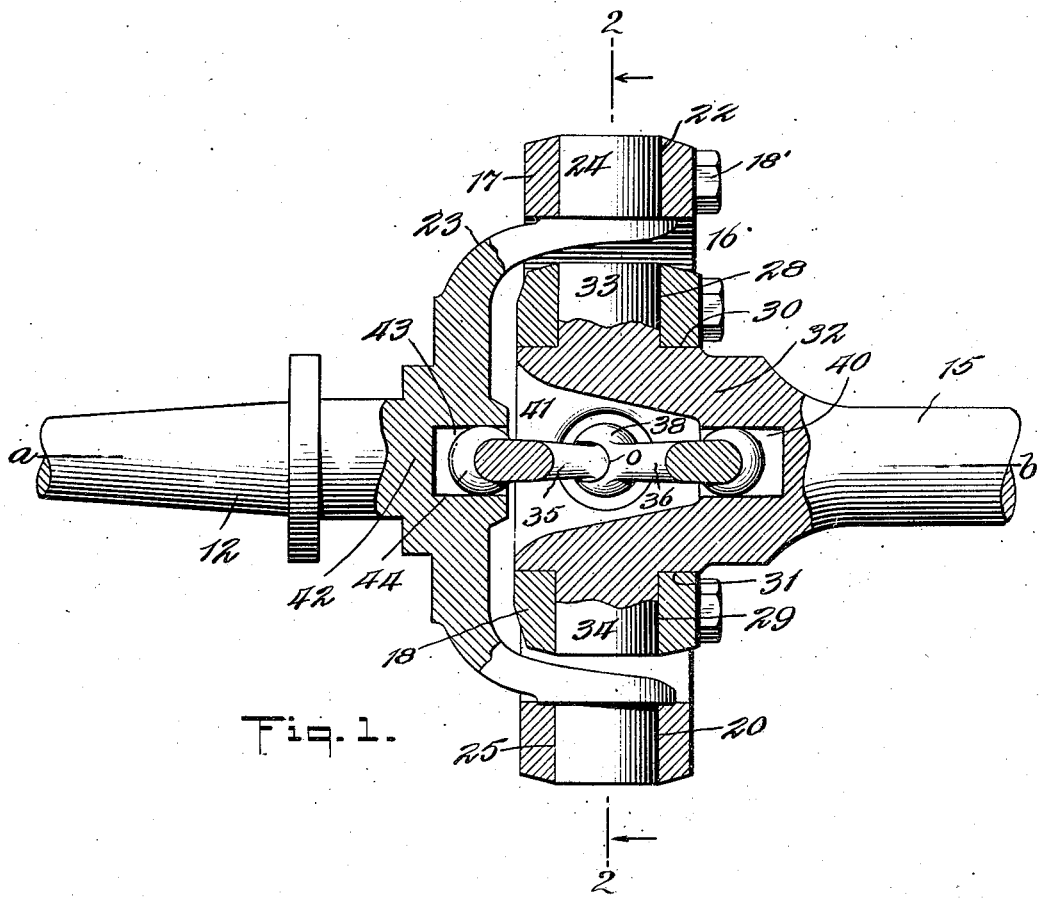

Feb. 8, 1927. ,617,016
W. H. DOUGLAS
UNIVERSAL JOINT
Original Filed May 27, 1924  2 Sheets-Sheet 1

INVENTOR
William H. Douglas
BY
Warren S. Orton.
ATTORNEY

Feb. 8, 1927. 1,617,016
W. H. DOUGLAS
UNIVERSAL JOINT
Original Filed May 27, 1924   2 Sheets-Sheet 2

INVENTOR
William H. Douglas
BY
Warren S. Orton.
ATTORNEY

Patented Feb. 8, 1927.

1,617,016

UNITED STATES PATENT OFFICE.

WILLIAM H. DOUGLAS, OF KEYPORT, NEW JERSEY, ASSIGNOR TO HEALEY AERO-MARINE BUS CO. INC., OF KEYPORT, NEW JERSEY, A CORPORATION OF NEW YORK.

UNIVERSAL JOINT.

Application filed May 27, 1924, Serial No. 716,087. Renewed December 3, 1926.

The invention relates in general to a universal joint constituting a driving connection between a driving and driven shaft or other power transmitting member and intended for application wherever such a device can be used. The invention in the form herein selected for disclosure has been specifically designed to constitute an improved form of flexible joint providing a power transmitting connection across the steering axis between the engine driven shaft and one of the steering wheels in a motor vehicle of the front drive type.

The primary object of the invention is to provide a simple form of flexible joint for efficiently and effectively transmitting rotary power from the one shaft to another while maintaining constant relative rotary speed between the shafts in all possible angular relative positions of the shafts.

In the form disclosed the driving and driven shafts are in driving relation through a joint which may be regarded as providing universal articulation, although in some situations the freedom of rotary movement of the joint may be restrained from movement in one of its possible planes of movement as would be the case where the driven shaft forms the line axle of a vehicle wheel mounted for movement about a steering axis. In such an instance, the invention features the providing for two degrees of rotational freedom between the driving and driven members; that is, it provides for a freedom of relative movement between the axis of the driving shaft and the axis of the wheel so that such movement may be resolved into two planes at right angles to each other.

The invention has for a further object to provide a relatively small size joint which will efficiently transmit heavy rotary torque without distorting the joint even when the shafts at a sharp angle or where the steering wheel is disposed at a high angle to its normal forward steering position. The invention further features a compact construction in which a small amount of metal is used to form the joint.

In the art of automotive vehicle construction it is highly desirable to reduce the turning radius and thus permit the vehicle to be turned about in a narrow street. Heretofore, there has been a practical limit to the steering angle which could be used in such devices.

Accordingly, another object of the invention is to provide a flexible joint in which the parts can be turned over a higher angle than has been practically possible heretofore and at the same time maintain a high degree of turning efficiency even while working through angles as high as, and even more than 45°.

The invention herein disclosed constitutes a development of a known form of universal joint constituting a shaft coupling and sometimes called a modified form of "Hooke" coupling. In this known form of joint, the adjacent ends of the shaft are formed into yokes to each of which yokes is pivoted to one of a pair of rings and which rings are pivotally connected at points 90° from the yoke connecting the rings with their respective shafts thereby to form an organization resembling a gimbal ring construction. The axis of rotation between these rings is maintained perpendicular to the plane of the shafts bisecting the angle between the shaft. There is attained by this construction a transmission of power with a constant velocity ratio between the shafts and this construction avoids any tendency of one shaft overrunning the other. The maintaining of the rings in this angle bisecting position is usually attained by means of four arms forming a linkage pivotally connecting the adjacent ends of the shaft with the rings. In these known forms of shaft drives the pivotal connection between the several movable parts are usually formed by the use of pivot pins. While this construction was sufficient to transmit the torque values in shaftings driving light forms of machinery the pivot pins quickly wore through their containing apertures and otherwise developed a looseness in fit. It has been found that with modern automotive power transmission, a large percentage of the engine power was thrown on the joint connected with the steering wheel when the wheel was turned over a high angle, such as 45°. As it is necessary to transmit forces of high horse-power through joints in front drive power shafting, space limitations prevented the solution of the problem presented simply by the use of larger joints. In general, the adoption of this pivoted form was a failure when an attempt was made to use the same as a wheel drive in modern automotive construction particularly where they were required to do heavy duty as in the case of heavy load trucks.

Accordingly, the present disclosure while utilizing a known principle of power transmission in joint structure, features a modified form of such transmission which is designed, organized and constructed for heavy duty work and intended to meet conditions where severe strains are placed on the joint due to the high angle through which the torque forces may be required to act.

In its practical application herein selected for specific discussion the invention features a constant ratio and at the same time a flexible as well as powerful drive between the differential shaft and the steering wheel shaft in a high powered automotive vehicle. In such constructions it is a commercial requirement that the power transmission joint be of small all-over dimensions, easily manufactured and assembled into a compact, simple form while combining ruggedness with lightness in weight.

Accordingly, the invention has for still another object the providing of a compact, small size joint in which the pivotal connections between the several movable parts are designed to distribute tearing strains thereon, in which parts have been reduced in number over similar constructions and in which strains have been transmitted as far as possible centrally through solid rigid members.

Various other objects and advantages of the invention will be in part obvious from an inspection of the accompanying drawings and, in part will be more fully set forth in the following particular description of one form of mechanism embodying my invention, and the invention also consists in certain new and novel features of construction and combination of parts hereinafter set forth and claimed.

In the accompanying drawings:—

Figure 2:
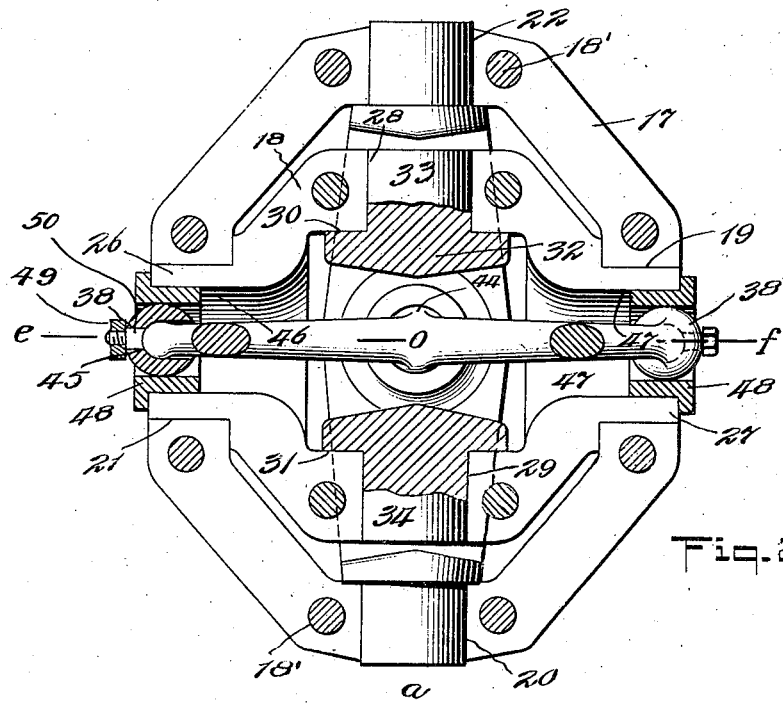
Figure 3:
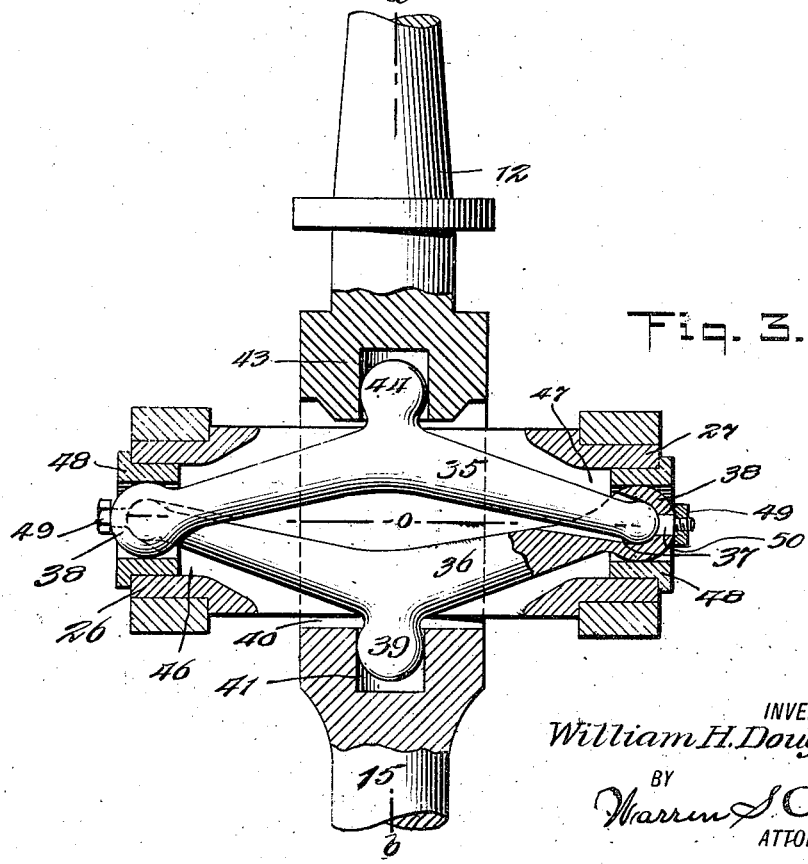

Figure 1 is a view partly in elevation of one side of a universal joint illustrating a preferred embodiment of the invention, with parts shown in vertical section and this showing may be assumed to illustrate specifically part of the wheel driving connection across the steering axis of a front drive wheel steering knuckle, and Figures 2 and 3 are each sectional views taken respectively on the lines 2—2 and a—b of Figure 1.

In the drawings there is shown a power transmission including a driven shaft 12, a driving shaft 15, operatively connected by a universal joint 16 particularly constituting the subject matter of the invention.

In the drawing the shaft 12 is intentionally illustrated without support to feature its possibility of movement into any angular position relative to the axis of the driving shaft 15. However it is within the scope of the disclosure to mount the shaft 12 in suitable bearings which may be contained in a support which is entirely fixed or which may be fixed only with reference to one of its degrees of rotational freedom as would be the case if the driving shaft were mounted in the steering knuckle or other conventional form of mounting for a front drive steering wheel.

The power shaft 15 may be assumed to be journalled in the body portion of an automotive vehicle and in order to facilitate explanation of the operation of the illustrated joint it will be assumed that the axis of the driving shaft is substantially fixed for rotation about the line o—b. However as this shaft is connected to the differential it is of course spring supported through the agency of the vehicle springs and is capable of some slight movement in all directions in space. There is thus specifically disclosed in the drawings a situation where there must be provided at least two degrees of relative rotational freedom between the driving member and the driven member, where constant rotary movement of the driven shaft and its associated wheel is desirable to maintain the load constant on the power plant and where heavy powerful torque forces must be transmitted efficiently even though the wheel be at a high angle to its normal forward driving position.

The joint 16 includes a gimbal ring construction and comprises an encircling frame 17 in the form of a ring, hereinafter identified as a bisecting ring or outer frame, and an inner frame 18 pivoted thereto for relative movement about an axis e—o—f by means hereinafter more fully described. It will be noted that all of the axes pass through a common point o at the center of the joint.

The frame 17 is identified as a ring due to its endless form as shown in Figure 2 but this frame might more properly be identified as a quadrilateral or lozenge shaped frame with the corners flattened to provide journalling spaces and preferably this ring is formed of two flat disks secured together by bolts 18'. This ring 17 is provided with four cylindrical bearings numbered clockwise Figures 2 as 19, 20, 21 and 22 the axes of which extend radially in opposing pairs and are spaced circumferentially 90° apart. Either one of the shafts 12 or 15, herein shown to be the driven shaft 12, has its end adjacent the other shaft formed into a wide spreading, flat U-shaped yoke 23 the ends of which are provided with integral, massive, outstanding and axially aligned trunnions 24 and 25 engaging respectively in the diametrically disposed bearings 22 and 20 in the encircling frame 17. In this way the ring 17 is pivotally and ruggedly connected to the end of one of the power shafts, herein shown to be the live wheel axle or driven shaft.

The inner ring or frame 18 is designed to fit within the outlines of the yoke 23 as shown in Figure 1 and is somewhat quadrilateral in elevation as shown in Figure 2. The frame is provided at diametrically opposite sides with outstanding, integrally formed, cylindrical frame trunnions 26 and 27 journalled respectively in the bearings 21 and 19. From this construction it will be seen that the rings or frames 17 and 18 are mounted for relative rotary movement about the axis e—f and that the connection between the rings are spaced circumferentially 90° from the trunnions connecting the same with their respective shafts. The frame 18 is provided with a pair of radially disposed cylindrical bearings 28 and 29, and the portion of the frame carrying these bearings have their inner opposing faces machined flat as shown at 30 and 31. Between these flat faces is centered a massive cube shaped head 32 defining the adjacent end of the power shaft 15. The head is provided with a pair of large diametered outstanding solid cylindrical trunnions 33 and 34 engaging respectively in the bearings 28 and 29. From this construction it will be seen that each of the shafts is journalled to a ring or frame and that the ring and frame are pivotally interconnected with each other so that there is formed a universal joint constituting a driving connection between the shafts thus connected through the universal joint.

In designing the construction thus far described it was desired to bring the ends of the shafts as close together as possible, to make the outlining ring 17 as small as possible, to utilize as much as possible of the contained space to accommodate the several parts, to minimize open spaces or clearances between the parts and to attain maximum rigidity with the use of the least possible amount of metal and thus form substantially a solid metal joint.

One of the features of this disclosure is to provide in the narrow confine thus outlined a rugged form or linkage for shifting the ring 17 or rather both the ring and frame in order to maintain the axis e—o—f in the plane bisecting the angle a—o—b between the axis of the driving and driven members. For this purpose there is disclosed a form of connection between the frame and the power members, sometime hereinafter referred to as a linkage, but which simply uses two members for connecting opposite sides of the ring with both the driving and the driven members. This linkage comprises two relatively long, distant bars 35 and 36 which, due to the fact that they are pivoted intermediate their length to the power members, are referred to hereinafter as rocking bars. The bars are similar in construction, are each solid throughout except for a journalling socket 37 at one end but even this socket containing end is enlarged to form a spherical head 38 designed to compensate for any weakness caused by the positioning of the socket therein and to provide a substantially solid ball for a ball and socket connection hereinafter more fully described.

The distant bar 36 is provided midway between its ends and on the side opposite the side provided with the socket with a spherical headed projection 39 journalled in a cylindrical socket 40 formed at the bottom of a recessed portion 41 in the end of the head 32. (See Figure 1.)

Similarly the shaft 12 at its point of connection with the yoke 23 is enlarged as shown at 42 to provide a massive head in the end of which is contained a cylindrical socket 43 in which is journalled a ball headed projection 44 extending from the middle portion of the distant bar 35. The end of each of the bars opposite the socketed end is provided with a relatively small diametered ball head 45 mounted for universal articulation in the socket 37 in the other distant bar. There is thus formed in effect a four-arm linkage in which two of the arms are rigidly connected to form one of the bars, the other two arms form the other bar and both bars extend on opposite sides of the axis of rotation of both the driving and driven members. Each of the bars is connected to its respective power member or shaft by a ball and socket form of universal articulation which has been found to be particularly efficient in transmitting the heavy torque forces herein featured. The distance bars are free to turn relative to each other for a limited rotary movement about the axis e—f and in each case arms extend solidly on opposite sides of this axis of rotation between the ring and frame to the axis of rotation of its associated shaft. The bars 35 and 36 may be locked against accidental endwise displacement by a nut 49 engaging an extension 50 from each of the heads 45 projecting through its associated head 38.

Each end of the distant bar linkage is mounted in the inner frame 18 for movement longitudinally of the axis e—f, is restrained in its movement to this axis but is otherwise free to articulate from different points on the axis. In order to attain this object and at the same time to feature a particularly rugged connection between the frame and the ends of the distant bar linkage, these ends are mounted internally in bearings formed in the inner frame. For this purpose the frame trunnions 26 and 27 are formed with hollow bores 46 and 47 in which are journalled the spherical headed ends 38 of the distant bars. Preferably a bearing shell 48 of the usual replaceable type is inserted through the open ends of the bore and positioned between the spherical head 38 and the inner surface of the trunnion outlining the bores.

In operation it will be understood that the shafts, either one or both of them, may be shifted into any relative angular position where the angle is more than 90° by means forming no part of the present disclosure. Assuming that the illustration is part of a vehicle wheel driving construction and in which the driven shaft is a wheel shaft then the driven shaft may be shifted by means of the conventional steering mechanisms and in which case the power is transferred across the axis of the turning knuckle as is well known in joints of the type which transmits power through the agency of a bisecting ring.

The power originates in shaft 15 turns the frame 18 which rotates the ring 17 and which in turn drives wheel or other mechanism through the driven shaft or axle 12. It is obvious however that the source of power might originate in the driven shaft as would be the case where the driven shaft 12 is a wheel shaft and when the vehicle is coasting in which case the shaft connected to the outer ring 17 becomes the driving member and the shaft 15 becomes a driven member. It is understood that the terms driving and driven are used interchangeably in this disclosure.

By means of the construction herein disclosed it has been possible to drive the front steering wheel with a constant velocity uniform turning of the wheel even when the steering wheel is turned at an angle as high as 45 degrees from its normal forward position. Strains on the several journalling points of the joint have apparently been equally distributed for with a physical form of joint such as that herein disclosed there has been no evidence of off-set wear of the pivoting parts such as characterizes the use of the old form of Hooke joint when used to transmit high power. In the present disclosure the power drive is entirely free of loose pivot pins and in general every effort has been made to eliminate looseness of movable parts and any tendency to rattle in the driving connections.

Having thus described my invention, I claim—

1. In a device of the class described, the combination of a powerful propelling device including a power shaft and a shaft driven therefrom, a flexible joint constituting a driving connection between the power shaft and the driven shaft, said joint including a ring-like frame pivoted to the power shaft, an encircling ring pivoted to the driven shaft and to the frame and a linkage for positioning the axis of relative rotary movement between the frame and the ring in the plane bisecting the angle between the axis of rotation of the power shaft and the driven shaft, said linkage including a pair of rocking distance bars extending across and disposed on opposite sides of the axis of the shafts, each bar provided intermediate its ends with a spherically headed projection, one engaging in the end of the power shaft at its axis of rotation, and the other journalled in the driven shaft at its axis of rotation, adjacent ends of said bars being pivotally connected for relative rotary movement about an axis coinciding with said axis of rotary movement between the frame and the ring, and one end of each of said bars being journalled for rotary movement in the frame.

2. In an automotive vehicle, the combination of a steering wheel axle, a power shaft, a driving connection between the power shaft and the wheel axle including a flexible joint, said joint including a ring disposed in a plane bisecting the angle between the axis of rotation of the shaft and the axis of rotation of the wheel axle, said ring fashioned to be sufficiently rugged to transmit the rotary torque of the power shaft to the wheel axle, and a pair of distance bars pivotally connected at one end, said connected ends being journalled for universal articulation and said bars having their opposite ends pivotally connected, one to the end of the shaft and the other to the wheel axle respectively at the axes of rotation of the shaft and wheel axle.

3. In a device of the class described, a power drive adapted for propelling a steering wheel of a vehicle, said drive including a driving shaft adapted to be carried by the body of the vehicle, a driven shaft adapted for driving one of the steering wheels of the vehicle, a universal joint constituting a driving connection therebetween and comprising an encircling ring outlining the joint and having four bearings with their axes extending diametrically from the center of the ring and circumferentially spaced 90° apart, one of said shafts provided with a yoke positioned within the ring and provided with a pair of outstanding trunnions journalled in an oppositely disposed pair of said bearings, an inner frame adapted to be contained within the outlines of the ring and provided with a pair of diametrically disposed, outstanding tubular trunnions journaled exteriorly in the other pair of said four bearings, the other shaft provided with a yoke contained within the outline of the frame, pivoted to the frame at points spaced 90° from the mounting of the same in the ring, and a flexible linkage comprising two rocking distance bars extending across the point of intersection of the axes of the shafts, pivotally connected at opposite ends and having said ends journalled within said pair of trunnions, with the rocking bars each pivoted intermediate their ends to the shafts, one bar for each shaft.

4. In a power transmission, the combination of a pair of shafts with their adjacent ends disposed relatively close to each other and terminating in yokes, the portion of the Y so formed at the ends of the shafts being massive and of greater cross sectional area than the adjacent portion of the shaft, each of said massive heads provided on the end facing the end of the other shaft with a cylindrical recess, a flexible joint providing a driving connection between the yokes and including a bisecting frame, a pair of spacing arms one pivoted to the other and both of said pivoted ends journalled in the frame and the opposite ends of said arms journalled in said sockets.

5. In a device of the class described, the combination of a pair of power shafts adapted to be disposed at an angle, an endless frame provided at diametrically opposite points with cylindrical bearings, one of said shafts pivoted to said frame, a second frame provided with trunnions journalled in said bearings and coacting therewith to form a massive rugged structure capable of withstanding powerful distorting strains imposed on the frames by the torque of the shafts, the second shaft pivoted to said second frame, said trunnions being hollow to provide axially extending cylindrical bores, a linkage connecting the shafts with the frames and including a pair of distance bars extending across the axis of the shafts, pivotally connected to each other at opposite ends and said ends journalled for rotary movement in said cylindrical bores.

6. In a joint for transmitting power, the combination of a driving member, a frame pivoted thereto, a driven member, a frame pivoted thereto, said frames being pivoted to each other intermediate their respective connections with the driving and driven members, a linkage between the driving and driven members comprising a pair of rigid arms, a universal joint connecting the arms at one end, the opposite end of one of the arms having a universally jointed connection with the driving member and the other arm being similarly connected to the driven member, and one of the frames provided with means for confining the universal joint between the arms to a straight line while permitting the arms to extend at variable angles to each other and to said straight line.

7. In a device of the class described, the combination of a driving member, a driven member, one of said members terminating in a yoke, an angle bisecting ring pivoted at diametrically opposite points to the yoke, an inner frame pivoted to the ring at points spaced approximately 90° from the pivotal connection of said member with the ring, the other member terminating in a yoke pivoted to said inner frame at points spaced approximately 90° from its pivotal connections with the ring, a pair of relatively long, rigid members constituting distance bars extending substantially in parallel relation between the driving and driven members, having their adjacent ends interengaging each other by means of a joint, said inner frame provided with a pair of aligned hollow bearings in which said joints are slidably mounted, and each member intermediate its length having a universally jointed connection with the adjacent driving or driven member as the case may be.

8. In a device of the class described, the combination of a pair of power members one constituting a driving member having a frame pivoted thereto, the other constituting a driven member having a frame pivoted thereto, means pivoting one frame to the other, said frames and means being operatively connected to cause the driving member to drive the driven member while the axes of the members are angularly disposed, one of said frames provided with a hollow bearing, a linkage connecting the power members, and comprising a pair of arms pivotally connected at one end and having their free ends journalled in the power members, the pivotally connected ends of said arms providing a joint contained in and guided by said hollow bearing.

9. In a flexible power transmission, the combination of a driving shaft, a driven shaft and a joint constituting a driving connection therebetween, said joint including a frame adapted to be contained in a plane bisecting the angle between the axes of the said shafts, means for maintaining the frame in said plane, said means comprising a pair of rigid bars, each journalled intermediate its ends respectively in one of the shafts, opposite ends of said bars being pivotally connected to each other and said connecting ends of the bars being each in turn journalled in said frame and free to rotate and to slide therein.

10. In a flexible power transmission, the combination of a driving shaft, a driven shaft and a joint constituting a driving connection therebetween, said joint including a frame adapted to be contained in a plane bisecting the angle between the axes of the said shafts, means for maintaining the frame in said plane, said means comprising a pair of rigid bars, each provided on its outer side with a spherical head journalled in a socket in the adjacent shaft, said bars pivotally connected at their outer ends and said connected ends being journalled in said frame.

11. In a device of the class described, the combination of a pair of shafts adapted to be shifted from and aligned into different positions extending at various angles to each other, a joint forming a driving connection between the shafts, said joint including a frame positioned in the plane bisecting the angle between the shafts and means for locating the frame in said plane, said means including a pair of arms, each having a universal jointed connection at one end with the frame, one of the arms being connected to one of the shafts and the other arm being connected to the other shaft and each of said arms enlarged to form the ball element of said connections whereby each end of each rod is mounted for universal articulation.

12. In a device of the class described, the combination of a pair of power members one constituting a driving member having a frame pivoted thereto, the other constituting a driven member having a frame pivoted thereto, means pivoting one frame to the other, said frames and means being operatively connected to cause the driving members to drive the driven member while the axes of the members are angularly disposed, one of said members provided with a bearing provided with a cylindrical bore, a linkage connecting the power members and comprising a pair of arms, one of said arms having one end journalled in said bore and the other end journalled for universal articulation in one of the power members, and the other arm journalled in the end of the first arm within the bore and its other end journalled for universal articulation in the other power member, and said arms being free to turn relative to each other about a line bisecting the angle formed between the axes of the power members.

13. In a device of the class described, the combination of a driving shaft and a driven shaft adapted to be moved at an angle to each other, a joint constituting a driving connection therebetween and including a frame adapted to be disposed in a plane bisecting the angle between the axes of the shafts and provided with a cylindrical bearing, means for maintaining the frame in said bisecting plane, said means including an arm pivoted to one of the shafts and having its other end fashioned to constitute an element, circular in cross section and rotatably mounted in said bearing, and a second arm pivoted to the other shaft and having an end pivotally connected to the first named arm within the outline of its engagement with the cylindrical frame.

14. In a device of the class described, the combination of a driving shaft and a driven shaft adapted to be moved at an angle to each other, a joint constituting a driving connection therebetween and including a frame adapted to be disposed in a plane bisecting the angle between the axes of the shafts and provided with a cylindrical bearing, means for maintaining the frame in said bisecting plane, said means including an arm pivoted to one of the shafts and having its other end fashioned to constitute an element circular in cross section and rotatably mounted in said bearing.

15. In a device of the class described, the combination of a pair of power shafts adapted to be disposed at an angle, a circular frame provided at diametrically opposite points with cylindrical bearings, one of said shafts pivoted to said frame, a second frame provided with out-standing trunnions journalled in said bearings and coacting therewith to form a massive rugged structure capable of withstanding powerful distorting strains imposed on the frames by the torque of the shafts, the second shaft pivoted to said second frame, said trunnions being hollow to provide axially extending cylindrical bores, a linkage connecting the shafts with the frames and including a pair of distance bars extending across the axis of the shafts, pivotally connected to each other at opposite ends and said ends journalled for rotary movement in said cylindrical bores, and bearing shells fitted in said bores and constituting removable bearings for containing the ends of the distance bars.

16. In a universal joint having a driving and a driven member and an intermediate member, spaced apart aligned bearings in the intermediate member, in combination with a controlling member comprising two rigid parts hinged together within said bearings and respectively articulated to the driving and the driven members.

17. A universal joint including an intermediate member having coaxial oscillating connection with a driving and with a driven member respectively, in combination with a cruciform member having a pair of arms engaging respectively the driving and the driven members, and a second pair of arms rigidly normal to the first and journalled in the intermediate member, said cruciform member being hinged on the axis of the arms journalled in the intermediate member.

18. In a flexible power transmission, the combination with a driving member a driven member and a joint constituting a driving connection therebetween said joint including a frame adapted to be contained in a plane bisecting the angle between the axes of the said members, of a means for maintaining the frame in said plane, said means comprising, a pair of rigid bars each having a laterally extending portion intermediate its ends, each of said portions articulated to one of the members, opposite ends of said bars being journalled in said frame and free to rotate and slide therein and to oscillate relatively to one another.

19. In a universal joint having a driving and driven member and an intermediate member coaxially articulated to the driving and the driven members respectively, a controlling means so engaging the driving and driven members as to maintain a mean angular position therebetween, a laterally rigid hinge portion in the controlling means normal to the axis of said engagements with the driving and driven members, said hinge portion being journalled in the intermediate member for oscillation and sliding.

20. In a power transmitting device, the combination with a pair of shafts having a flexible joint providing a driving connection therebetween and including a pair of frame members to which the shafts are respectively journalled, of a control means for the flexible joint including a pair of non-drive transmitting members, one pivoted to the other and having their pivoted ends journalled in the frame members, and laterally extending portions on the said control members respectively articulated to an adjacent shaft.

21. In a universal joint having a driving and a driven member and an intermediate member provided with spaced apart aligned bearings, joint controlling means operatively connected to said driving and driven members, extending into said bearings, and including a pair of rigid members hingedly connected, maintained in their hinged relation by said bearings and restrained against relative axial motion.

Signed at New York city in the county of New York and State of New York this 26th day of May, A. D. 1924.

WILLIAM H. DOUGLAS.